(12) United States Patent
Hagen

(10) Patent No.: US 9,243,593 B2
(45) Date of Patent: Jan. 26, 2016

(54) DEVICE FOR VENTILATING A FUEL TANK

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 1021 days.

(21) Appl. No.: 13/328,273

(22) Filed: Dec. 16, 2011

(65) Prior Publication Data

US 2012/0168454 A1 Jul. 5, 2012

(30) Foreign Application Priority Data

Dec. 21, 2010 (DE) .......................... 10 2010 055 319

(51) Int. Cl.
*F02M 25/08* (2006.01)
*B60K 15/035* (2006.01)
*B60K 15/03* (2006.01)

(52) U.S. Cl.
CPC ...... *F02M 25/0836* (2013.01); *B60K 15/03519* (2013.01); *F02M 25/08* (2013.01); *B60K 2015/0319* (2013.01); *B60K 2015/0321* (2013.01); *B60K 2015/03514* (2013.01)

(58) Field of Classification Search
CPC .............. F02M 25/0809; F02M 25/08; F02M 25/0836; F02M 25/089; F02D 41/0032; F02D 41/004; F02D 41/0042; F02D 41/0045
USPC ........... 123/516, 518, 519, 520; 137/587, 589
See application file for complete search history.

(56) References Cited

U.S. PATENT DOCUMENTS

| | | | | |
|---|---|---|---|---|
| 4,116,184 A | * | 9/1978 | Tomita | 123/438 |
| 4,677,956 A | * | 7/1987 | Hamburg | 123/520 |
| 4,748,959 A | * | 6/1988 | Cook et al. | 123/406.45 |
| 5,174,265 A | | 12/1992 | Sekine | |
| 5,349,935 A | * | 9/1994 | Mezger et al. | 123/520 |
| 5,359,978 A | * | 11/1994 | Kidokoro et al. | 123/520 |
| 5,371,412 A | * | 12/1994 | Iwashita et al. | 290/1 R |
| 5,465,703 A | * | 11/1995 | Abe | 123/674 |
| 5,474,049 A | * | 12/1995 | Nagaishi et al. | 123/520 |
| 5,520,160 A | * | 5/1996 | Aota et al. | 123/675 |
| 5,560,347 A | * | 10/1996 | Reddy et al. | 123/520 |
| 5,669,360 A | * | 9/1997 | Hyodo et al. | 123/520 |
| 5,682,869 A | * | 11/1997 | Nankee et al. | 123/698 |
| 5,921,222 A | * | 7/1999 | Freeland | 123/520 |
| 6,003,498 A | * | 12/1999 | Reddy | 123/520 |
| 6,012,435 A | * | 1/2000 | Takahashi et al. | 123/519 |
| 6,047,688 A | * | 4/2000 | Duty et al. | 123/520 |
| 6,085,731 A | * | 7/2000 | Duty | 123/520 |
| 6,119,512 A | * | 9/2000 | Duty et al. | 73/114.39 |
| 6,119,662 A | * | 9/2000 | Duty et al. | 123/520 |
| 6,196,203 B1 | * | 3/2001 | Grieve et al. | 123/520 |
| 6,227,037 B1 | * | 5/2001 | Kawamura et al. | 73/49.7 |
| 6,276,343 B1 | * | 8/2001 | Kawamura et al. | 123/520 |
| 6,305,362 B1 | | 10/2001 | Kitamura et al. | |

(Continued)

FOREIGN PATENT DOCUMENTS

DE 10 2006 049 876 4/2008
DE 10 2009 036 262 2/2011

*Primary Examiner* — Thomas Moulis
(74) *Attorney, Agent, or Firm* — Henry M. Feiereisen LLC

(57) ABSTRACT

A device for ventilating a fuel tank of an internal combustion engine in particular of a fuel tank of an internal combustion engine of a motor vehicle includes an activated carbon filter and at least one valve which is controllable by a control unit. To prevent leakage of hydrocarbons into the environment without enlargement of the activated carbon filter the control unit controls the valve in dependence on a load factor of the activated carbon filter and/or in dependence on an operating cycle duration of the internal combustion engine.

12 Claims, 1 Drawing Sheet

(56) References Cited

U.S. PATENT DOCUMENTS

| | | |
|---|---|---|
| 6,367,457 B1 | 4/2002 | Mancini et al. |
| 6,453,887 B1 * | 9/2002 | Hayashi et al. ............... 123/520 |
| 6,659,087 B1 * | 12/2003 | Reddy ........................... 123/520 |
| 6,796,295 B2 | 9/2004 | Kidokoro et al. |
| 7,305,975 B2 * | 12/2007 | Reddy ........................... 123/520 |
| 7,347,191 B2 * | 3/2008 | Atwood et al. ............... 123/516 |
| 7,591,252 B1 * | 9/2009 | Park ............................... 123/520 |
| 7,762,241 B2 * | 7/2010 | Childress et al. ............. 123/520 |
| 8,394,172 B2 * | 3/2013 | Bierl et al. ......................... 95/12 |
| 8,434,461 B2 * | 5/2013 | Kerns et al. ................... 123/521 |
| 2011/0247595 A1 * | 10/2011 | Ogita et al. ................... 123/521 |
| 2014/0224225 A1 * | 8/2014 | Kragh ............................ 123/520 |

\* cited by examiner

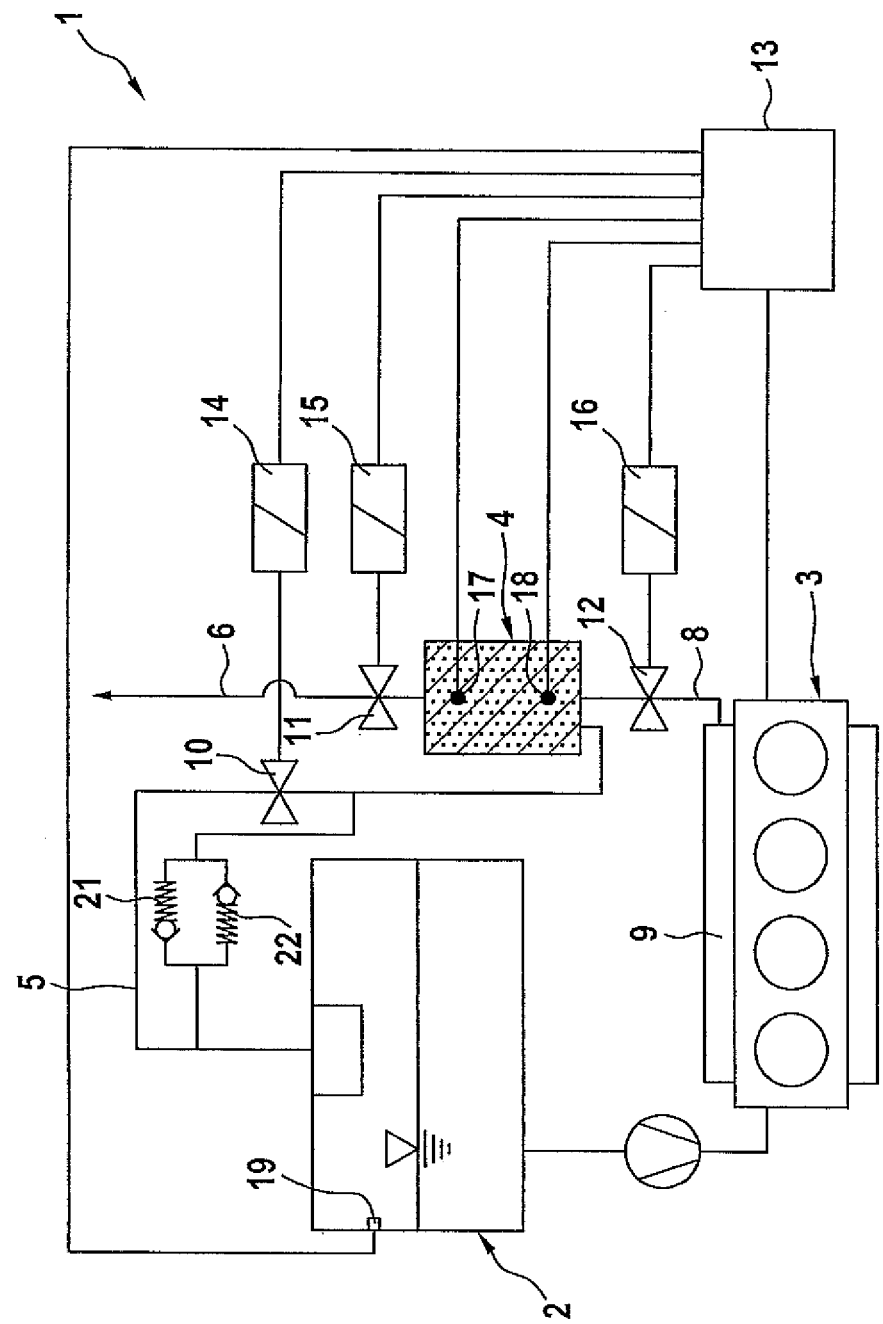

DEVICE FOR VENTILATING A FUEL TANK

CROSS-REFERENCES TO RELATED APPLICATIONS

This application claims the priority of German Patent Application, Serial No. 10 2010 055 319.0, filed Dec. 21, 2010, pursuant to 35 U.S.C. 119(a)-(d).

BACKGROUND OF THE INVENTION

The invention relates to a device for ventilating a fuel tank of an internal combustion engine, in particular of a fuel tank of an internal combustion engine of a motor vehicle.

The fuel tank of motor vehicles is normally equipped with a tank ventilation device. On one hand, the tank ventilation device prevents that, in the case of a significant rise or drop of ambient temperatures, an undesired overpressure or negative pressure forms in the pressure-tight closed tank as a result of the evaporation of fuel caused by the rise of temperature or, respectively, condensation of fuel vapors caused by the drop of temperature. On the other hand, the tank ventilation device allows a gas mixture which is displaced by the fuel during refueling, to escape from the interior of the fuel tank. To prevent an undesired leaking of hydrocarbons into the atmosphere or the environment in the mentioned cases, modern tank ventilation devices include an activated carbon filter which is usually connected to the fuel tank by a first gas line, to the atmosphere or environment by a second gas line and to an intake tract of the internal combustion engine by a third gas line. The first gas line serves for ventilating the fuel tank and contains at least one tank shut-off valve, which automatically opens at a predetermined overpressure or negative pressure in the fuel tank and is opened by the control unit during refueling of the fuel tank to conduct the displaced gas mixture through the activated carbon filter. The gas mixture which during refueling and/or when the tank shut-off valve is opened, flows out of the fuel tank into the activated carbon filter where it is cleared of hydrocarbons, is conducted out into the atmosphere through the second gas line.

The second gas line contains a ventilation and aeration valve, which is opened by the control unit when the fuel tank is ventilated, and also when the tank shut-off valve is opened and as a result of negative pressure in the fuel tank, air is aspirated from the environment through the second gas line and the activated carbon filter into the fuel tank or, when air is aspirated from the environment through the second gas line, the activated carbon filter and the third gas line into the intake tract of the internal combustion engine when regenerating the activated carbon filter during operation of the internal combustion engine, to flush the activated carbon filter clear of the adsorbed hydrocarbons and to conduct the hydrocarbons together with the aspirated air into the combustion chambers of the internal combustion engine for burning. The third gas line contains a regeneration valve which is opened by the control unit when the activated carbon filter is regenerated.

During normal operation of a motor vehicle with an internal combustion engine, the activated carbon filter is regenerated regularly, because the internal combustion engine is frequently operated under load conditions which allow a regeneration of the activated carbon filter. In contrast, the load conditions appropriate for regenerating the activated carbon filter occur less frequently in motor vehicles with hybrid drive or in so-called plug-in motor vehicles with an electric motor which serves as drive engine and an internal combustion engine which is only carried along as auxiliary motor and for recharging the vehicle battery. This can have the consequence that an activated carbon filter which is loaded with a larger amount of hydrocarbons cannot be regenerated over an extended period of time. Similar considerations apply to motor vehicles with automatic start-stop mechanism, because in this case the idle state which is appropriate for regeneration of the activated carbon filter occurs less frequently. In such a case, an undesired release of hydrocarbons from the activated carbon filter through the second gas line into the atmosphere or the environment may occur. To avoid this, the activated carbon filter could be dimensioned greater which, however, is disadvantageous with regard to costs and installation space.

SUMMARY OF THE INVENTION

Taking the foregoing into account, the invention is based on the object to improve a device of the aforementioned type in such a way that a leaking of hydrocarbons can be avoided without increasing the size of the activated carbon filter.

According to the invention, this object is solved in that the control unit controls the valve in dependence on an operating condition of the activated carbon filter and/or in dependence on an operating cycle duration of the internal combustion engine.

The valve can be the tank shut-off valve in the first gas line between the fuel tank and the activated carbon filter, the ventilation and aeration valve in the second gas line between the activated carbon filter and the environment, or the regeneration valve in the third gas line between the activated carbon filter and the intake tract of the internal combustion engine.

When the valve is the tank shut-off valve in the first gas line between the fuel tank and the activated carbon filter, the opening cross section and/or the opening duration of the valve are expediently decreased by the control unit in the case of a high load factor of the activated carbon filter, when the tank shut-off valve opens as a result of an overpressure in the fuel tank. This allows decreasing the amount of fuel vapors flowing from the fuel tank into the activated carbon filter when the tank venting valve is opened, to a degree which allows the fuel vapors to still be completely adsorbed by the activated carbon filter and to avoid a rupture of the activated carbon filter. In cases in which the opening pressure of the valve is controlled by the control unit, the opening pressure is increased in the case of a high load factor. In the case of a rise of ambient temperatures, the previously described measures can lead to an increase of the pressure in the fuel tank. Therefore, after a decrease of the opening cross section, the opening duration or the opening pressure of the valve, the control unit will, as described above according to a preferred embodiment of the invention, immediately open the valve after the next regeneration of the activated carbon filter and establish the original state. In addition, an overpressure protection valve can be provided in the first gas line before the tank shut-off valve to prevent an impermissible pressure in the fuel tank.

A change of the opening pressure of the valve by the control unit takes place preferably in that the spring characteristics of a spring acting upon a valve member of the valve, is changed, preferably in that the actuator compresses the spring to some degree in the case of a desired rise of the opening pressure and relieves the spring to some degree in the case of a desired lowering of the opening pressure.

When the valve is the ventilation and aeration valve in the second gas line between the activated carbon filter and the environment, the opening cross section and/or the opening duration of the tank shut-off valve in the first gas line and/or the ventilation and aeration valve in the second gas line is enlarged in the case of a high load factor of the activated carbon filter when the fuel tank and/or the activated carbon filter is ventilated, or the opening pressure of the tank shut-off valve in the first gas line and/or the ventilation and aeration valve in the second gas line is decreased to decrease the flow resistance of the air which is aspirated from the environment. In addition, the opening cross section and/or the opening duration of the tank shut-off valve in the first gas line and/or the ventilation and aeration valve in the second gas line or its opening pressure is decreased, when the load factor of the activated carbon filter is small, to thereby keep the number of pressure increases to which the fuel tank is exposed in the course of its lifetime low.

When the valve is the regeneration valve in the third gas line between the activated carbon filter and the intake manifold of the internal combustion engine, the opening cross section of the valve is advantageously decreased by the control unit when the load factor of the activated carbon filter is high. This prevents that too much fuel is added and thus that the gas mixture which is fed into the cylinders for combustion is too rich, i.e. contains too much fuel. At the same time, the opening duration of the valve is increased to achieve a complete regeneration of the activated carbon filter in spite of the decreased opening cross section.

The invention is based on the idea that the loading condition or the load factor of the activated carbon filter of modern motor vehicles is already stored in the engine control unit and thus can be used as control parameter without significant effort for controlling one of the valves of the ventilation and aeration device. Similar considerations apply to the operating cycle time of the internal combustion engine, which is also recorded by the engine control unit. The operating cycle duration of the internal combustion engine allows to draw conclusions about the loading condition or the load factor, respectively of the activated carbon filter, so that instead of the loading condition or the load factor of the activated carbon filter the operating cycle time of the internal combustion engine can be used as control parameter for the valve. Long operating cycle times of the internal combustion engine generally correspond to a low load factor of the activated carbon filter while short operating cycle times indicate higher load factors of the activated carbon filter. Beside the loading condition or load factor, respectively, of the activated carbon filter and the operating cycle duration of the internal combustion engine, the ambient temperature or the temperature in the fuel tank or in the activated carbon filter respectively, as well as the pressure in the fuel tank are preferably included as control parameters for the control of the valve.

The valve can be an actively controlled valve, whose opening pressure, opening cross section and/or opening duration is actively changed by the control unit in dependence on the loading condition of the activated carbon filter and/or in dependence on the operating cycle duration of the internal combustion engine, and which is completely closed when turned off or when not supplied with current. As an alternative, the valve can be a passive valve which, when switched off or when not supplied with current, retains an opening pressure or opening cross section which was previously set by the control unit. Preferably, the valve is an electromagnetic proportional valve, whose opening pressure or opening cross section is proportional to the amperage of an exciting current conducted from the control to the valve.

BRIEF DESCRIPTION OF THE DRAWING

In the following, the invention is explained in more detail by way of exemplary embodiments shown in the drawing. The single FIGURE shows a schematic representation of a device according to the invention for ventilating a fuel tank of an internal combustion engine of a motor vehicle.

DETAILED DESCRIPTION OF PREFERRED EMBODIMENTS

The device 1 according to the invention shown in the drawing serves for ventilating a fuel tank 2 of an internal combustion engine 3 which for example can be the internal combustion engine of a motor vehicle with hybrid drive or of a motor vehicle with automatic start-stop mechanism, or the device can be the internal combustion engine of a plug-in motor vehicle which is driven by an electric motor, which combustion engine serves as an auxiliary motor for charging a vehicle battery.

The device 1 includes an activated carbon filter 4, which is connected to the interior of the fuel tank 2 by a first gas 5 line which is also referred to as tank venting line, to the environment or the atmosphere by a second gas line 6 also referred to as ventilation line, and to an intake tract 9 by a third gas line 8 also referred to as regeneration line. The first and the third gas lines 5, 8 lead into the activated carbon filter 4 at one side, while the second gas line 6 leads into the activated carbon filter at the opposite side.

A tank shut-off valve 10 is inserted into the first gas line 5, while a ventilation and aeration valve 11 is inserted into the second gas line 6 and a regeneration valve 12 into the third gas line 8. Each valve 10, 11 and 12 is a controllable proportional valve with an actuator in the form of an electromagnet 14, 15, 16. The opening cross section of the valves 10, 11, 12 is controlled in the opened state by an engine control unit 13 of the internal combustion engine 3 in dependence on the loading condition of the activated carbon filter 4. The valves 10, 11, 12 can be active valves, whose opening cross section respectively corresponds to the amperage of the exciting current which is conducted to the electromagnet 14, 15, 16 of the valve 10, 11, 12 under the control of the engine control unit 13, or passive valves, whose opening cross section is changed by the engine control unit 13 by changing the exciting current to the electromagnet 14 of the valve 10, 11, 12, and is maintained when the current supply to the electromagnet 14, 15 or 16 respectively is interrupted by the engine control unit 13.

The activated carbon filter 4 is equipped with two loading sensors 17, 18, to determine the loading of the activated carbon filter 4 with hydrocarbons. The first sensor 17 is arranged near the site of entry of the second gas line 6 in the activated carbon filter 4, while the second sensor 18 is arranged at a defined distance to the site of entry of the first and the third gas lines 5, 8 in the activated carbon filter 4. Both sensors 17, 18 determine the presence of hydrocarbons and are connected to the engine control unit 13 for analyzing the sensor signals. Because the activated carbon filter 4 is loaded with hydrocarbons from the junction of the first gas line 5 and unloaded or rinsed with fresh air, respectively, from the opposing junction of the second gas line 6, the load factor of the activated carbon filter is high when the sensor 17 and the sensor 18 respond, moderate when only sensor 18 responds and low when neither of the sensors 17, 18 responds.

The tank is further equipped with a pressure sensor 19, which measures the pressure in the fuel tank 2 and transmits it to the engine control unit 13, where the pressure is compared with a permissible pressure range. When the pressure in the fuel tank 2 exceeds the upper limit of the permissible range, the engine control unit 13 opens the two valves 10 and 11 to conduct gas from the fuel tank 2 through the activated carbon filter 4 into the environment or the atmosphere 7 and thereby relieves the pressure in the fuel tank 2. When the pressure in the fuel tank 2 falls below the lower limit of the permissible range, the engine control unit also opens the two valves 10 and 11, to conduct air from the environment or atmosphere 7 through the activated carbon filter 4 into the fuel tank 2 and to thereby achieve pressure compensation.

When the load factor of the activated carbon filter 4 determined by means of the sensors 17, 18 is high, the opening pressure of the valve 10 is increased by the engine control unit 13 when the tank shut-off valve is opened as a result of overpressure in the fuel tank 2, so that the valve 10 only opens at a higher pressure, which prevents hydrocarbons to enter the activated carbon filter 4 before the opening pressure is reached. As soon as the activated carbon filter 4 is regenerated and the load factor determined by the sensors 17, 18 is moderate or low, the engine control unit 13 opens the valve 10 to relieve an overpressure that may still persist. When opening the valve 10 the engine control unit 13 reestablishes the lower opening pressure. To prevent that an impermissible overpressure or negative pressure builds up in the fuel tank 2, a bypass line 20 with an overpressure protection valve 21 and a negative pressure protection valve 22 can be provided, which branches off from the first gas line between the fuel tank 2 and the valve 10 and leads into the first gas line 5 behind the valve 10 as shown in the drawing.

In contrast, when the valve 10 is opened the opening pressure of the valve 10 in the first gas line 5, as a result of a negative pressure in the fuel tank 2, is decreased by the engine control unit 13 when the load factor of the activated carbon filter 4 determined by the sensors 17, 18 is high. This may allow a somewhat better flushing of the activated carbon filter 4 by ambient air which flows into the fuel tank 2 and is further flushed by the inflowing ambient air rather continuously and not intermittently. In this case, the opening pressure of the ventilation and aeration valve 11 in the second gas line 6 is also decreased by the engine control unit 13.

When the load factor of the activated carbon filter 4 is high, the opening cross section of the regeneration valve 12 in the third gas line 8 is decreased when the activated carbon filter is regenerated, to prevent too much fuel from being added into the intake manifold. At the same time the opening pressure of the ventilation and aeration valve 10 in the second gas line 6 is decreased as much as possible and the regeneration valve 12 is opened as long as possible in dependence on the load condition of the internal combustion engine, to achieve a complete regeneration of the activated carbon filter 4 in spite of the smaller opening cross section.

When the load factor of the activated carbon filter 4 is low, the regeneration valve 12 in the third gas line 8 is controlled according to the desired amount of fuel to be fed from the activated carbon filter 4 into the intake manifold, while the opening pressure of the tank shut-off valve 10 in the first gas line 5 and the ventilation and aeration valve 11 in the second gas line 6 are decreased as much as possible.

A desired opening pressure or a desired opening cross section can be set beforehand at the valves 10, 11 and 12.

The invention claimed is:

1. A device for ventilating and aerating a fuel tank of an internal combustion engine, comprising:
    an activated carbon filter;
    a tank shutoff valve arranged in a gas line between the fuel tank and the activated carbon filter; and
    a control unit for controlling the at least one valve in dependence on at least one of a load factor of the activated carbon filter and an operating cycle duration of the internal combustion engine, wherein at least one member selected from the group consisting of an opening cross section of the tank shut-off valve and an opening duration of the tank shut-off valve is decreased or an opening pressure of the tank shut-off valve is increased when the load factor of the activated carbon filter is high and the tank shut-off valve is opened in response to an overpressure in the fuel tank.

2. The device of claim 1, for use in a motor vehicle.

3. The device of claim 1, wherein the tank shut-off valve is opened immediately after a regeneration of the activated carbon filter, and the member is increased again or the opening pressure is decreased again.

4. A device for ventilating and aerating a fuel tank of an internal combustion engine, comprising
    an activated carbon filter;
    a ventilation and aeration valve arranged in a gas line between the activated carbon filter and an environment; and
    a control unit for controlling the at least one valve in dependence on at least one of a load factor of the activated carbon filter and an operating cycle duration of the internal combustion engine, wherein at least one member selected from the group consisting of an opening cross section of the tank shut-off valve and an opening duration of the tank shut-off valve is decreased or an opening pressure of the tank shut-off valve is increased when the load factor of the activated carbon filter is high and the tank shut-off valve is opened in response to an overpressure in the fuel tank.

5. The device of claim 1, further comprising another valve constructed as a ventilation and aeration valve and arranged in a gas line between the activated carbon filter and an environment.

6. The device of claim 5, wherein at least one member selected from the group consisting of an opening cross section of the tank shut-off valve, an opening cross section of the ventilation and aeration valve, an opening duration of the tank shut-off valve and an opening duration of the ventilation and aeration valve is increased when the load factor of the activated carbon filter is high and the tank shut-off valve is opened in response to a negative pressure in the fuel tank.

7. The device of claim 5, wherein at least one member selected from the group consisting of an opening pressure of the tank shut-off valve and an opening pressure of the ventilation and aeration valve is decreased when the load factor of the activated carbon filter is high and the tank shut-off valve is opened in response to a negative pressure in the fuel tank.

8. A device for ventilating and aerating a fuel tank of an internal combustion engine, comprising
    an activated carbon filter;
    a regeneration valve and aeration valve arranged in a gas line between the activated carbon filter and an intake tract of the internal combustion engine; and
    a control unit for controlling the at least one valve in dependence on at least one of a load factor of the activated carbon filter and an operating cycle duration of the internal combustion engine, wherein at least one member selected from the group consisting of an opening cross section of the tank shut-off valve and an opening duration of the tank shut-off valve is decreased or an opening pressure of the tank shut-off valve is increased when the load factor of the activated carbon filter is high and the tank shut-off valve is opened in response to an overpressure in the fuel tank.

9. The device of claim 8, wherein during regeneration of the activated carbon filter at least one member selected from the group consisting of an opening cross section of the regeneration valve and an opening duration of the regeneration valve is decreased when the load factor of the activated carbon filter is high.

10. The device of claim 8, further comprising another a valve constructed as a ventilation and aeration valve, wherein during regeneration of the activated carbon filter at least one member selected from the group consisting of an opening cross section of the ventilation and aeration valve and an opening pressure of the ventilation and aeration valve is increased when the load factor of the activated carbon filter is high.

11. The device of claim 1, wherein the at least one valve is an active or passive valve.

12. The device of claim 1, wherein the at least one valve has a valve spring having a spring characteristic changeable to control an opening pressure of the at least one valve.

* * * * *